Figure 1:
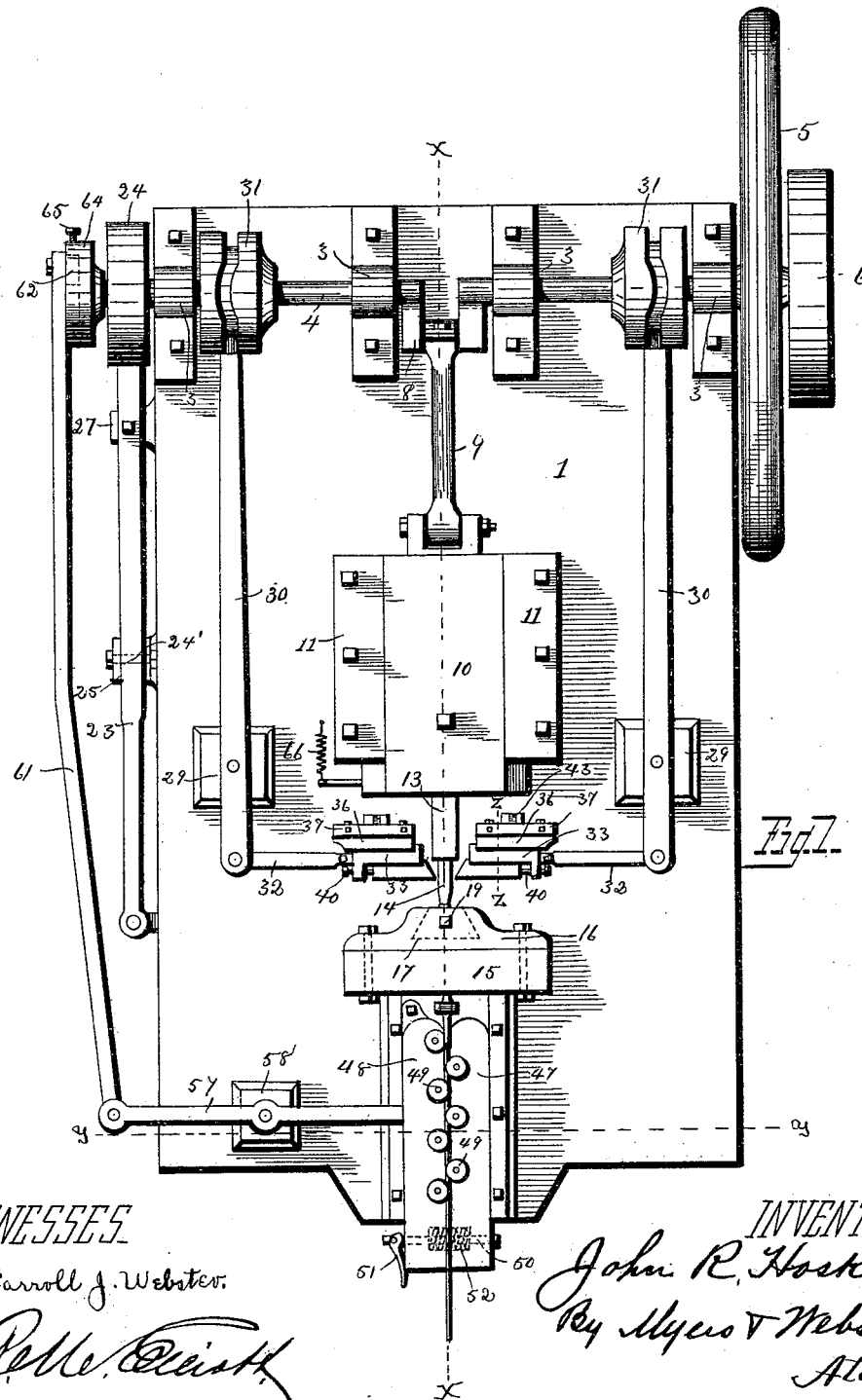

(No Model.) 3 Sheets—Sheet 1.

J. R. HOSKIN.
WIRE NAIL MAKING MACHINE.

No. 460,720. Patented Oct. 6, 1891.

WITNESSES
Carroll J. Webster.

INVENTOR
John R. Hoskin
By Myers & Webster
Attys

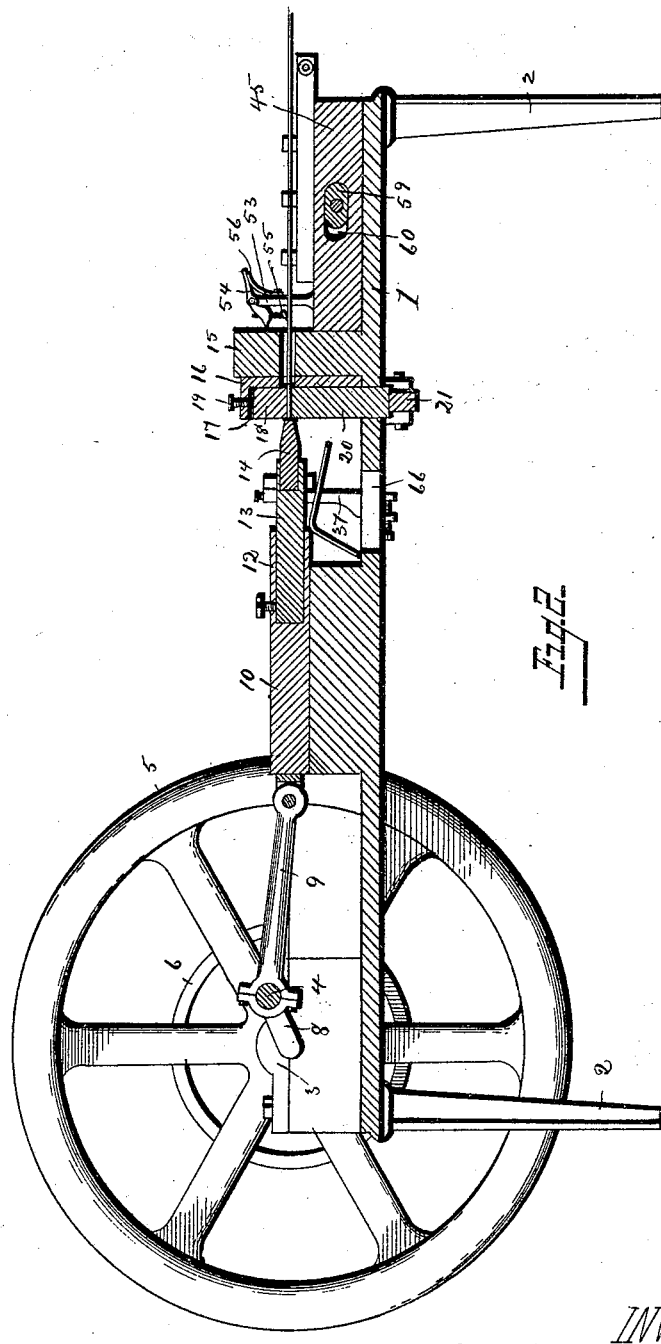

(No Model.) 3 Sheets—Sheet 3.
J. R. HOSKIN.
WIRE NAIL MAKING MACHINE.
No. 460,720. Patented Oct. 6, 1891.
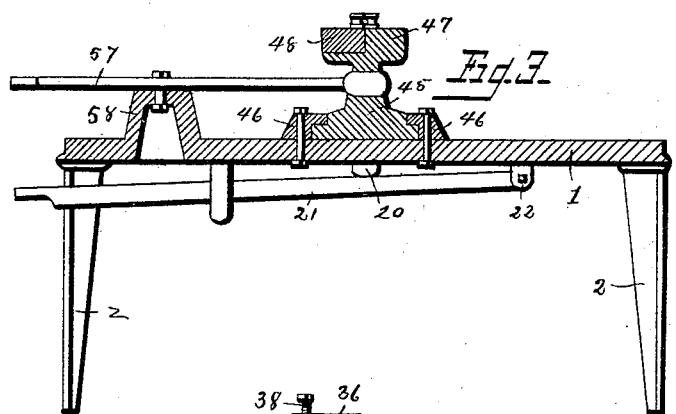
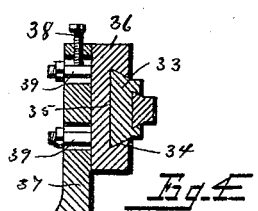
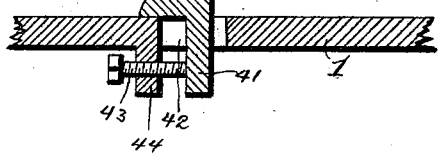
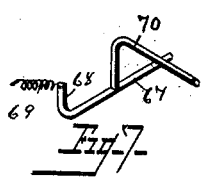
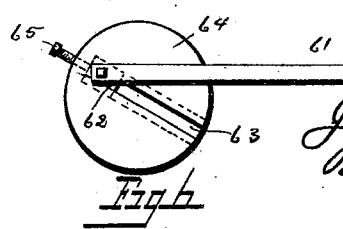
WITNESSES
Carroll J. Webster.
INVENTOR
John R. Hoskin
By Myers & Webster
Att'ys

UNITED STATES PATENT OFFICE.

JOHN R. HOSKIN, OF TOLEDO, OHIO, ASSIGNOR, BY DIRECT AND MESNE ASSIGNMENTS, TO JAMES M. LIVELY AND JAY M. YOUNGS, BOTH OF SAME PLACE.

WIRE-NAIL-MAKING MACHINE.

SPECIFICATION forming part of Letters Patent No. 460,720, dated October 6, 1891.

Application filed September 15, 1890. Serial No. 365,111. (No model.)

*To all whom it may concern:*

Be it known that I, JOHN R. HOSKIN, of Toledo, in the county of Lucas and State of Ohio, have invented certain new and useful Improvements in Wire-Nail-Making Machines; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to a machine for making wire nails.

The object of the invention is to provide a wire-nail machine, having a simple arrangement of mechanism to admit of rapid adjustment to make nails of various sizes; a further object is to produce a wire-nail machine having a simple arrangement of mechanism to feed the requisite amount of wire through the machine, operate the die to upset the head, cut and point the nail, and discharge from the machine; a further object is to produce a wire-nail machine which shall be simple of construction, efficient and durable in use, and comparatively inexpensive of production.

With these objects in view the invention consists in the novel construction and combination of parts of a wire-nail machine, as will be hereinafter fully described and claimed.

In the accompanying drawings, forming part of this specification, and in which like numerals of reference indicate corresponding parts, I have illustrated one form of device embodying the essential features of my invention, although the same may be carried into effect in other ways without in the least departing from the spirit thereof, and in these drawings—

Figure 1 is a top plan view of the complete machine. Fig. 2 is a longitudinal sectional view taken on the line *x x* of Fig. 1. Fig. 3 is a transverse sectional view taken on the line *y y*, same figure. Fig. 4 is a longitudinal sectional view taken on the line *z z*, showing more particularly the construction of the knife-carrying frame. Fig. 5 is a detail view of a cam for raising and lowering the grippers. Fig. 6 is a view of an improved adjusting device for regulating the feed of the wire to the machine; and Fig. 7 is a perspective view of a device for ejecting the finished nail from the machine.

Referring to the drawings, 1 designates the bed-plate of the machine, which is constructed of any suitable material, preferably of iron, and is supported upon legs 2. At one end of the bed-plate are mounted a series of journal-boxes 3, in which is journaled the main or drive shaft 4, carrying a balance-wheel 5 and a pulley 6, around which passes a belt (not shown) connecting with a suitable source of power. At a point preferably near the center of the shaft is formed a crank 8, upon which is mounted one end of a connecting-rod 9, the opposite end of which connects with a plate 10, working in guides 11, bolted to the bed-plate. At the opposite end of the plate to that at which the connecting-rod is mounted is formed a recess 12, in which is removably secured a die-holder 13, carrying a die 14 for upsetting the heads of the nails. Immediately in alignment with the die is the anvil-block 15, which is preferably formed integral with the bed-plate. To the anvil-block is rigidly bolted a plate 16, which is formed with a dovetailed recess 17, in which is mounted the stationary jaw 18 of the grippers, the said jaw being elevated or depressed by means of a bolt 19. The lower or movable jaw 20 of the grippers bears upon a rod 21, one end of which is pivoted between hangers 22, secured to the under side of the bed-plate, while the opposite end connects with one end of a lever 23, the opposite end of which bears upon the under side of an eccentric 24, mounted upon the main shaft 14. The rod 23 is pivoted at 24' to a projection 25 on the bed-plate, and between its pivotal point and the eccentric bears upon a spring 26, mounted upon a projection 27, also projecting from the bed-plate, which spring is designed to keep the rod in constant engagement with the cam, any lateral play being prevented by means of a bolt 28, extending through the rod.

Upon the bed-plate are arranged two standards 29, upon which are pivoted two levers 30, one end of each of which levers engages with a cam-groove pulley 31 on the drive-shaft, and the opposite end with rods 32. These latter rods connect with knife-holders 33, which are formed with dovetail bases 34, designed to move in dovetail recesses 35, formed in guides 36, which are adjustably mounted upon standards 37 on the bed-plate, the said adjustment being accomplished by means of bolts 38, which extend through one of the bolts 39, which clamp the guide to the standard, so as to admit of an accurate adjustment of the knives vertically, while the lateral adjustment is accomplished by means of bolts 40, which bear against the inner ends of the knives, as clearly shown in Fig. 1. The lower end of each of the standards 37 is formed with a downward-extending projection 41, each of which extends through a recess 42 formed in the bed-plate, and is designed to be engaged by a bolt 43, mounted in a lug 44 on the said bed-plate, whereby the knives may be adjusted longitudinally, so as to bring their cutting-edges into perfect alignment.

The mechanism for straightening and feeding the wire through the machine consists of a block 45, which is mounted between guides 46 on the bed-plate. Upon the upper side of the said plate is secured the straightening-roll carriage, consisting of a stationary portion 47 and a movable portion 48, both of which portions carry a plurality of straightening-rolls 49. At a point near the outer end of the carriage, and extending transversely through the two portions, is a bolt 50, carrying an eccentric-lever 51, which is adapted to clamp the two portions of the same rigidly together. The carriage also carries a spring 52, the normal tendency of which is to force the two portions apart. At a point adjacent to the anvil-block and mounted upon the block 45 is a standard 53, upon which is pivoted a lever 54, one end of which carries a drag-catch 55, adapted to engage the wire to feed it through the machine, the opposite end of the said lever being engaged by a spring 56, the function of which is to keep the drag-catch normally in engagement with the wire. The block 45 is reciprocated by means of a lever 57, which is pivoted upon a block 58 of the bed-plate and carries on its inner end an enlarged head 59, working in a slot 60 in the block. In contour this head is approximately circular, the object being to get as near a ball-bearing as possible and also to overcome undue wear, which would necessarily follow if the rod itself engaged the recess. The outer end of the rod 57 connects with a rod 61, carrying at the end opposite its pivotal point a block 62, which is designed to engage a diametrical slot 63, formed in a wheel or disk 64 on the drive-shaft. This block is engaged by a bolt 65, by means of which the said block may be moved to or from the center, and thereby increase or diminish the throw of the rod 57, causing the feed of the wire to be increased or diminished, and thus proportionately to shorten or lengthen the nails to be made.

Having thus fully described my invention, I will explain the manner of its operation. The cam-lever is first actuated to release the movable portion of the straightening-roll carriage, so as to admit of the wire being inserted between the rolls a sufficient distance to bring it into engagement with the grippers, and the lever is then thrown into the position shown in Fig. 1, which securely locks the movable portion in place. The machine is then started, and as soon as the eccentric bears upon the rod 23 the rod 21 will be actuated to close the grippers, and thus securely clamp the wire in place. The mechanism is so adjusted that at the moment the grippers close the crank passes its forward throw, and thus brings the die forcibly against the protruding end of the wire and upsets it and forms the head. As the die recedes the eccentric releases the rod 23, when the spring 26 will cause it to follow the contour of the eccentric and thus release the grippers, so that the wire is under no pressure whatever. At this moment the rod 57 is thrown forward, which causes the drag-catch to engage with the wire and feed an amount through the machine equal to the length of one nail. The cam-groove in the wheels 31 then vibrates the rods 30 and causes the knives to move in, thus cutting off the finished nail. The die now moves forward and the die-holder contacts with an ejecting device, which throws the finished nail through a recess 66 and into a suitable receptacle. The ejecting device consists of a rod 67, one end of which is bent up to form an arm 68, to which is connected a coiled spring 69, which exerts a rearward tension upon the rod. At a point intermediate the ends of the said rod is formed an angular rod 70, which is arranged in the path of travel of the die-holder, and when in its raised position extends above the knives. It will readily be seen that when the die-holder moves forward and contacts with the arm 70 and forces it down, as shown in Fig. 2, the finished nail will be ejected from the machine.

Having thus fully described my invention, what I claim as new, and desire to secure by Letters Patent, is—

1. In a wire-nail-making machine, a bed-plate carrying a block and means for reciprocating the same, in combination with a straightening-roll carriage mounted on said block, and a drag-catch pivotally supported upon the block and adapted to engage the wire to feed it forward.

2. In a wire-nail-making machine, a bed-plate carrying a block and means for reciprocating the same, in combination with a straightening-roll carriage mounted on said block, a drag-catch pivotally supported upon the block and adapted to engage the wire to feed it forward, and a spring for keeping the said catch in operative position with relation to the wire.

3. In a wire-nail-making machine, a bed-plate carrying a block and means for reciprocating the same, in combination with a straightening-roll carriage mounted on said block, a drag-catch for feeding the wire forward, gripping-dies, an upsetting-die, and knives for cutting and pointing the nail.

4. In a wire-nail-making machine, a bed-plate carrying a block and means for reciprocating the same, in combination with a straightening-roll carriage mounted on said block, a drag-catch for feeding the wire forward, gripping-dies, an upsetting-die, knives for cutting and pointing the nail, and an ejector actuated by the upsetting-die for discharging the finished nail from the machine.

5. In a wire-nail-making machine, gripping-dies consisting of a stationary and a movable jaw, in combination with a rod with which the movable jaw engages, an eccentric carried by the drive-shaft, and a lever connecting the said eccentric and the rod.

6. In a wire-nail-making machine, the combination of the upsetting-die, the knives, a drag-catch for moving the wire from the die to the knives, and an ejector actuated by the upsetting-die for discharging the finished nail from the machine.

In testimony that I claim the foregoing as my own I affix my signature in presence of two witnesses.

JOHN R. HOSKIN.

Witnesses:
E. B. SOUTHARD,
R. M. ELLIOTT.